Feb. 24, 1970     G. A. ADAMS ET AL     3,497,086
NESTED CONTAINER COUNTING AND SEPARATING MECHANISM
Filed July 24, 1968     3 Sheets-Sheet 1

INVENTOR.
GARY A. ADAMS
EDWARD J. RUSSELL
BRADLEY A. SCHNEPP
BY Learman & McCulloch
Attorneys Feb. 24, 1970   G. A. ADAMS ET AL   3,497,086
NESTED CONTAINER COUNTING AND SEPARATING MECHANISM
Filed July 24, 1968   3 Sheets-Sheet 2

INVENTOR.
GARY A. ADAMS
EDWARD J. RUSSELL
BRADLEY A. SCHNEPP
BY
Learman & McCulloch
Attorneys Feb. 24, 1970    G. A. ADAMS ET AL    3,497,086
NESTED CONTAINER COUNTING AND SEPARATING MECHANISM
Filed July 24, 1968    3 Sheets-Sheet 2

INVENTOR.
GARY A. ADAMS
EDWARD J. RUSSELL
BY BRADLEY A. SCHNEPP

United States Patent Office 3,497,086
Patented Feb. 24, 1970

3,497,086
NESTED CONTAINER COUNTING AND
SEPARATING MECHANISM
Gary A. Adams, Beaverton, Edward J. Russell, Gladwin, and Bradley A. Schnepp, Beaverton, Mich., assignors to Brown Machine Company of Michigan, Inc. Beaverton, Mich., a corporation of Michigan
Filed July 24, 1968, Ser. No. 747,221
Int. Cl. B65g 60/00; G06m 7/00
U.S. Cl. 214—7
13 Claims

ABSTRACT OF THE DISCLOSURE

Mechanism for accumulating randomly supplied containers in a nested stack and, after the stack has been built progressively to a predetermined length, counting out and removing a predetermined number of containers from the stack. The machine incorporates sensing means for determining when an accumulating stack has reached a predetermined length and a counting wheel having teeth which mesh with the rims of the containers to count out a predetermined number of containers upon a predetermined angular rotation of the counting wheel.

---

Prior art machines of this general character, such as the machine disclosed in Midgley U.S. Patent No. 3,313,-482, have been of the type which continuously count a container stack. In contradistinction, the present machine is suited to processing containers which are so randomly supplied to an accumulating stack that the machine can be operative only after a predetermined accumulation of containers. Thus, the machine to be presently described is well suited to use with printing machines for applying printed subject matter and ornamental configurations to the side walls of the containers, as well as other processing machines.

One of the prime objects of the present invention is to provide a nested container counting and separating machine which accumulates individually supplied containers in a nested stack and cycles only after the stack has been built to a predetermined length.

A further object of the invention is to design mechanism of the character described incorporating a counting wheel assembly which is movable transversely to and from a container counting position and, when moved to a remote position relative to a container stack, functions to automatically initiate the separation of a counted stack from the noncounted containers.

Another object of the invention is to provide a rotatable counting wheel asembly which also is movable longitudinally to fully separate the counted stack from the uncounted containers, and which requires no flexible separating finger past which the counted containers must be moved during the counting operation.

Still another object of the invention is to provide apparatus of this character wherein the counting wheel assembly serves to return containers, which have not been counted, to counting position once the separation of a counted stack has been accomplished, and also functions as a stop for the accumulating stack between machine cycles.

Still a further object of the invention is to design a highly efficient and reliable machine which can be economically manufactured and assembled.

Other objects and advantages of the invention will be pointed out specifically or will become apparent from the following description when it is considered in conjunction with the appended claims and the accompanying drawings, in which:

GENERAL DESCRIPTION

Figure 1:
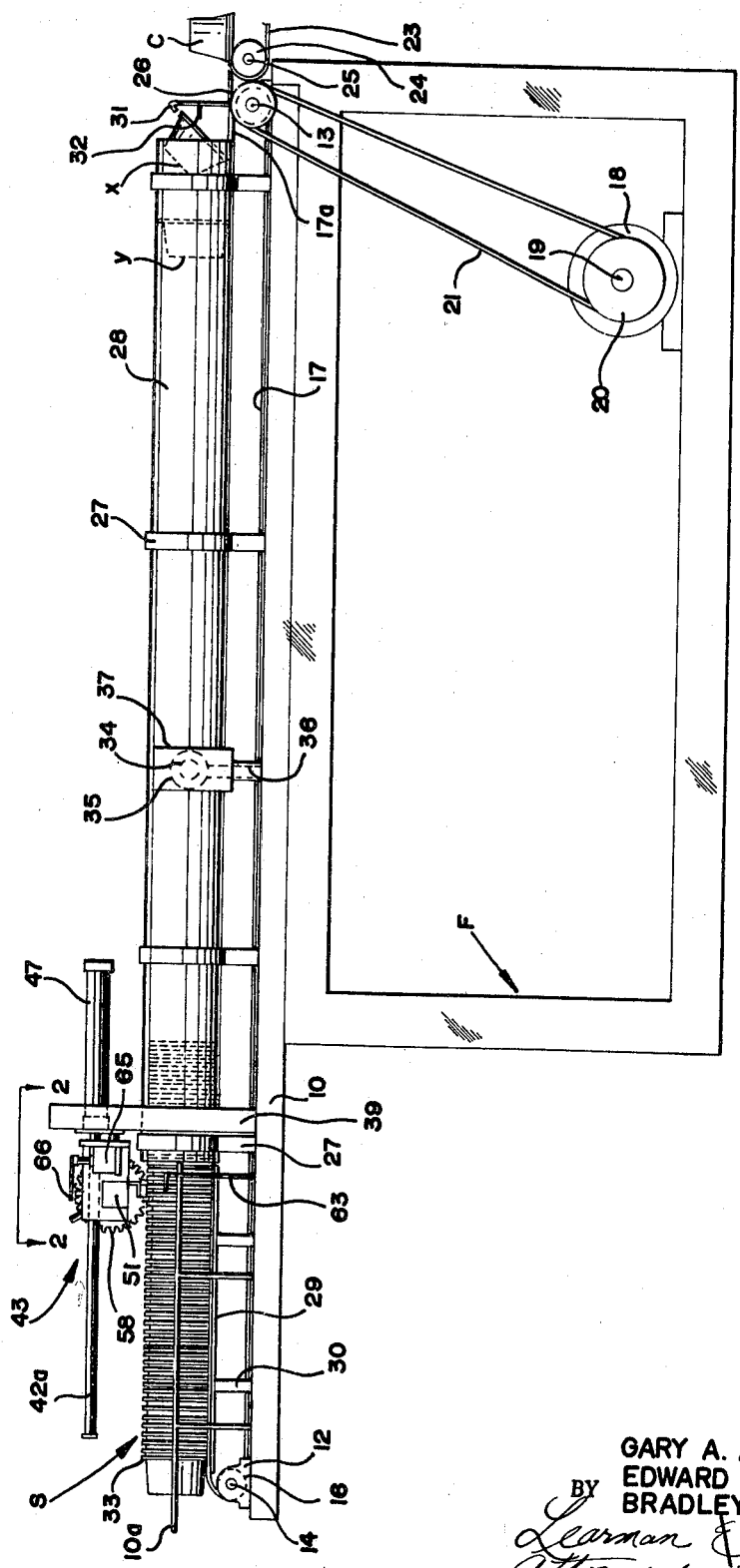
FIGURE 1 is a side elevational view of our container conveying and counting apparatus shown counting out a stack of containers.

Referring now more particularly to the accompanying drawings, in which we have shown a preferred embodiment of the invention only, a letter F generally designates a frame on which the apparatus is supported adjacent a container processing machine such as a container printing machine of the character disclosed in the present assignees' copending application Ser. No. 729,056, filed May 14, 1968, and entitled Mechanism for Removing Containers From Mandrels. Mounted on the frame F and projecting rearwardly therefrom are support channels 10 for front and rear bearings 11 and 12 which journal front and rear conveyor shafts 13 and 14, respectively. The shafts 13 and 14 support conveyor roller members 15 and 16, respectively, around which an endless conveyor belt 17 is trained. A motor 18, having an armature shaft 19, may be employed to continuously drive the conveyor belt 17 via a pulley 20 on the armature shaft 19, a drive belt 21, and a pulley 22 mounted on the front conveyor shaft 13.

It will be seen that the upper run 17a of the belt 17 is at a level with, and adapted to receive, plastic containers or cups C from an endless, longitudinally extending, delivery conveyor belt 23, trained around rollers 24 fixed on shafts 25, as shown. A bridge plate 26 is typically provided between the conveyor belts 17 and 23 at the level of the upper runs thereof. Mounted on the top plate 10 and supported by a series of clamp ring assemblies 27 is an open-ended, cylindrical tube 28 through which the upper run 17a of the flexible endless belt 17 extends, the upper run 17a of the light belt 17 assuming the curvature of the tube 28. The tube 28 supports the upper run 17a through most of its length, but at the rear end of the machine a guide plate 29, supported by channel members 30, extends at the level of the lower interior surface of tube 28, as shown, to support the rear end portion of the upper run 17a of the belt 17. The diameter of tube 28 is sufficient so that the containers C move freely therein from the front end thereof to the stack S which forms in the rear end of the tube 28. Guide rods 10a extending rearwardly from the tube 28 operate to direct the containers rearwardly in an axial direction during the counting operation which will presently be described.

At the front end of the machine an air delivering nozzle 31 supported above the path of a container C moving across the bridge plate 26 and onto the upper run 17a of the conveyor 17 delivers a jet of high pressure air at the leading edge of each container bottom, as it passes beneath, and tips it to the position x in FIGURE 1. A second air nozzle 32 delivers a jet of air under pressure to the interior of the tilted container C in position s and continues to pivot it about its lip or bead as a fulcrum to cause it to assume the horizontal orientation in which it is shown at postion y in FIGURE 1. As will be clear from FIGURE 1, the containers C move rearwardly in horizontal orientation, under the influence of the air jet 32 and the rearwardly traveling upper run 17a, and form an ever increasing stack S of containers C which have their lip or bead portions 33 forwardly disposed. The containers or cups C are delivered in randomly spaced relation to the conveyor 17, which is driven continuously by the motor 18.

Provided in the tube 28 are transversely aligned, parallel openings 34. Mounted to direct a light beam through the apertures 34 at a reflective target plate 35, mounted on a support 36, is an electric eye unit 37 of the type manufactured by General Electric Co., in the United States of America, Model No. 3S7505PS511. The target plate used may be General Electric Model No. 44A216277–002. Both units 35 and 37 are commercially available mechanisms, unit 37 functioning both as a beam transmitter and a receiver, as FIGURE 7 indicates, and incorporating a normally open time delay switch 38 which closes only if the emitted light beam is blocked for more than a fraction of a second. Thus, the switch 38 will not be closed when the containers C are moved rapidly past the apertures 34 but will be opened when the stack S builds to the point that the beam is blocked for more than a fraction of a second, and in this latter case will operate to energize stack counting and separating mechanism which will now be described.

THE CONTAINER COUNTING AND STACK SEPARATING MECHANISM

Supported on the pair of beams 10, near the rear end of container tube 28, are a pair of upright channel members 39 which are connected by a cross bar member 40, the bar 40 being secured to the channel members 39 by bolts 41 and nut members 42. Projecting rearwardly from the cross bar or cross plate 40 are guide rods 42a on which a container counting and stack separating assembly, generally designated 43, is mounted for reciprocatory travel.

Figure 2:
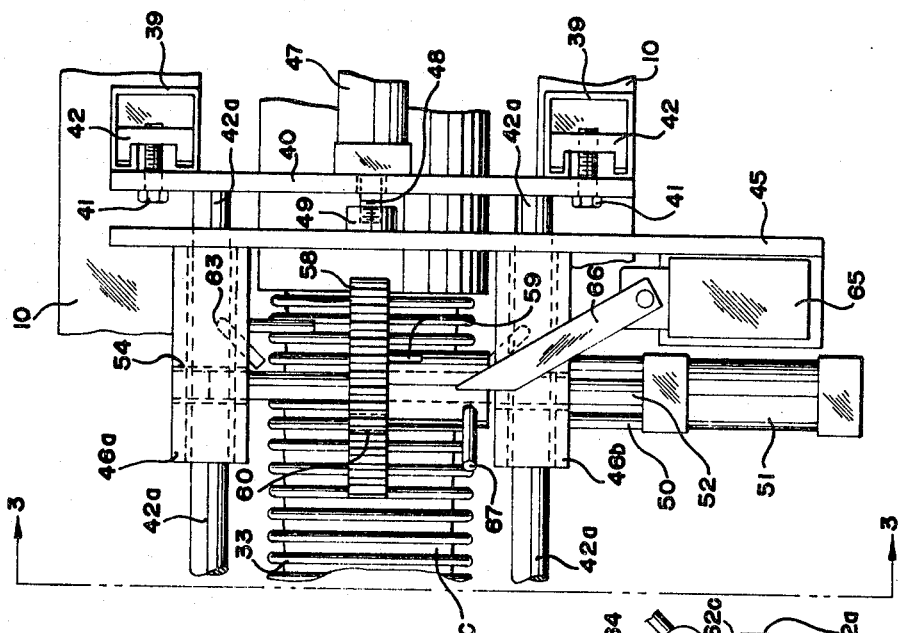
FIGURE 2 is an enlarged, fragmentary top plan view thereof, taken on the line 2—2 of FIGURE 1.

The assembly 43 includes a carriage member generally designated 44 comprising a front plate 45 supporting slide bearings 46a and 46b through which the rods 42a extend. A single-acting, spring returned, fluid pressure operated cylinder 47 fixed to the support bar 40 has a piston rod 48 extending through an opening 40a in the plate 40 to connect with a coupling 49 secured to the carriage front plate 45, as shown in FIGURE 2, and, when advanced, operates to move the carriage 44 rearwardly. Mounted on support bolts 50, extending laterally from the slide bearing block 46b, is a double-acting, fluid pressure operated cylinder 51 which has a piston rod 52 extending through an opening 53 in bearing block 46b and on into an opening 54 in the bearing block 46a. The piston rod 52 may be grooved as at 55 to receive the internal flange 56 provided on the hub 57 of a spur gear forming a counting wheel 58 in a manner so that the gear 58 is freely rotatable on the piston rod 52, when the gear 58 is in the position shown in FIGURE 3, but moved axially with it. The air cylinder 51 is operable to retract the piston rod 52 and move the gear 58 from a leftward position shown at a in FIGURE 3 to the solid line position shown in FIGURE 3 to commence counting containers C when the stack S builds sufficiently so that the opening 34 adjacent target plate 35 is covered by the lips 33 of the containers C in stack S.

Figure 4:
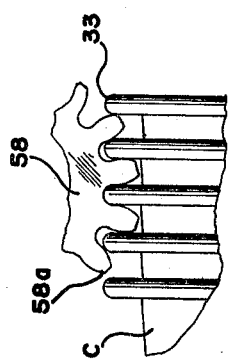
FIGURE 4 is an enlarged, fragmentary, side elevational view illustrating the manner in which the counting wheel teeth engage the lips of the containers to perform the counting operation.

FIGURE 4 well illustrates the manner in which the teeth 58a of the gear engage between the lips 33 of the containers C as the stack S operates to revolve the gear 58, which has a predesignated number of teeth, such as 100, on the piston rod 52. When the gear 58 is shifted leftward in FIGURE 3 to a position in which the teeth 58a do not engage the lips 33 of the containers C, a pin 59 projecting laterally from the slide bearing 46a is received within an opening 60 provided in the gear 58 and prevents rotation thereof until the gear 58 is moved rightward once again.

Figure 5:
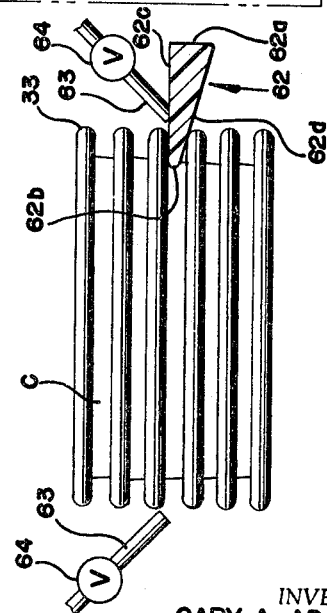
FIGURE 5 is a fragmentary, enlarged top plan view, taken on the line 5—5 of FIGURE 4, and illustrating the manner in which a counted stack containing a predetermined number of containers is separated upon withdrawal of the counting wheel mechanism.
Figure 3:
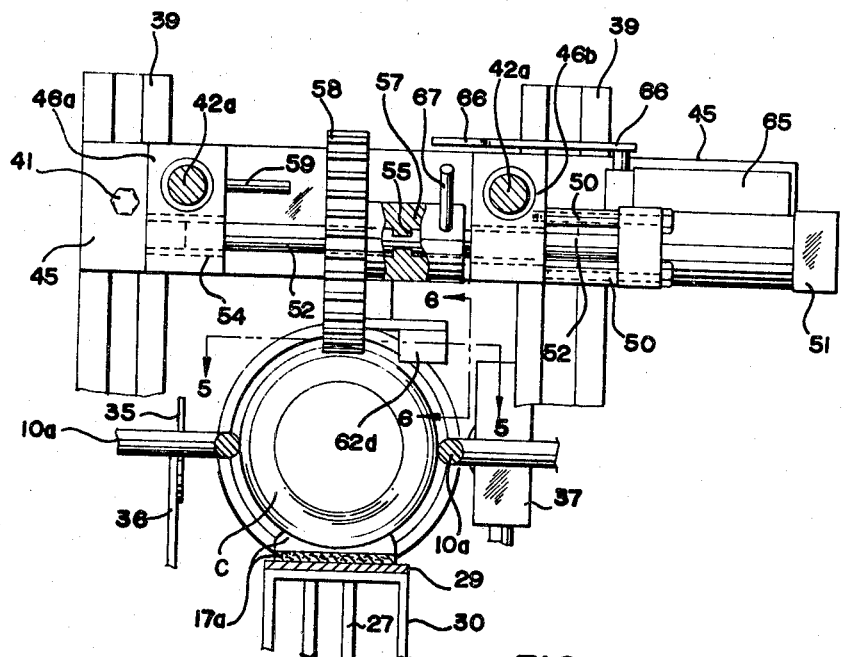
FIGURE 3 is a transverse sectional view, taken on the line 3—3 of FIGURE 2.
Figure 6:
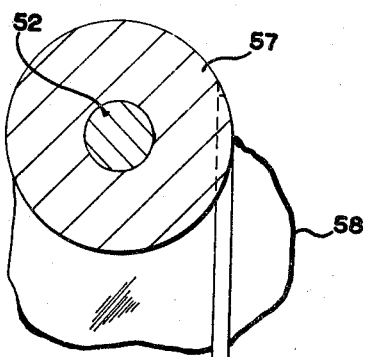
FIGURE 6 is a still more enlarged, fragmentary, side elevational view, taken on the line 6—6 of FIGURE 3.

Depending from the gear hub 57 and fixed thereto is a support arm 61 (see FIGURE 6) which supports a wedge-shaped "nylon" block, generally designated 62, having a back wall 62a and a leading end 62b connected by a transverse wall surface 62c and an axially inclined container camming surface 62d. When the gear 58 in FIGURE 3 is moved leftward, the wedge block 62 moves inwardly, as shown in FIGURE 5, to initially separate a counted stack of cups which, when the gear 58 has 100 teeth, will comprise a stack of 100 containers. The wedge block 62 operates to initially separate the counted stack from those stacked containers C which have not been counted and air delivery tubes 63 deliver jets of air to assist the separating action, solenoid operated, spring returned, normally closed air valves 64 being provided to open the tubes 63 to a suitable source of air under high pressure at this time.

Figure 7:
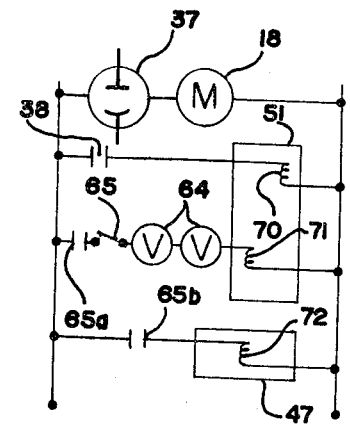
FIGURE 7 is a schematic electrical circuit illustrating the manner in which the various electrically operated elements are typically controlled.

Mounted on the front plate 45 of the carrier assembly 44 is a limit switch 65 having an operating arm 66 in position to be engaged by an actuating rod 67 extending radially from the gear hub 57. The switch 65 has normally open contacts 65a and 65b, contacts 65b being time delay contacts which close an instant after contacts 65a. FIGURE 7 shows a typical electrical control circuit, including a double-acting air cylinder 51, having a retract solenoid 70 in series with the switch 38, and an advance solenoid 71 in series with the contacts 65a. The air cylinder 47 has an advance solenoid 72 in circuit with the normally closed electrically operated valves 64 and contacts 65b.

THE OPERATION

In operation, containers C are moved into the tube 28 in the manner indicated previously and are blown at relatively high speeds to the rear end thereof under a pressure which may be in the neighborhood of 80 p.s.i., where they form the stack S in the rear end of the tube 28. When a sufficient number of containers or cups C have accumulated to block the opening 34 adjacent target plate 35, the normally open switch 38 is closed and the retract solenoid 70 of cylinder 51 is energized to move the counting wheel 58 to the right in FIGURE 3 to engage the spur gear teeth 58a with the lips 33 of the containers C. Prior to this, the wedge block 62 was in a central position forming a stop and preventing the containers C from moving rearwardly. When the gear 58 moves rightward in FIGURE 3 into counting position, and the pin 59 is freed from opening 60, the force of the rearwardly moving stacked containers C is sufficient to turn the freely revolving gear 58 on the piston rod 52, and the gear 58 revolves until the actuator rod 67 actuates the limit switch 65. This occurs when the gear 58 has completed one full revolution and, if there are 100 teeth on gear 58, then after 100 containers have been counted, in effect, by the gear 58. When the switch 65 is actuated, the advance solenoid 71 of cylinder 51 is first energized and rod 52 is advanced to move the gear 58 leftward. At this time the opening 60 is in position to receive the pin 59 to prevent further rotation of the gear 58, and the wedge block 62 is moved to the left to separate the counted stack of containers C from the remaining containers C, as demonstrated in FIGURES 5 and 6. Because the gear 58 has been moving containers C to the left, as shown in FIGURE 1, during the counting operation, the opening 34 adjacent target plate 35 has been cleared and switch 38 has again opened so that solenoid 70 is deenergized and movement of the piston rod 52 can occur. When the gear 58 completes its movement to the left following a counting operation, the time delay contacts 65b close to operate air cylinder 47 and move the carrier assembly 44 rearwardly to thus move the counted stack of containers C rearwardly out of the path of the next containers which will be counted when the stack has again built sufficiently to close the switch 38. The valves 64 are energized at the same time as the cylinder 51 to assist the wedge block 62 in the initial separation of the counted stack. The tendency of any cup to tilt and wedge inside the cup in which it is nested is obviated by the air jets 63 which operate to prevent this and insure that the containers C rearward of the wedge block 62 are moved in an axial path in parallelism without tilting. The carriage 44 is promptly returned after reaching rearmost position and moves any containers which have moved rearward of the foremost position of stop surface 62c back to this position. Upon the return of the carriage 44, the surface 62c functions as a stop for the stacking containers and, when a sufficient number have again accumulated so that the light beam is again blocked, the cycle is, of course, repeated.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention.

We claim:

1. Nested container counting and separating mechanism comprising: longitudinally extending support means over which rimmed containers to be counted are moved; means for moving containers to said support means in horizontal disposition and forming a progressively building nested stack thereon; wheel means mounted for rotation in response to the pressure of said moving containers adjacent said support means in the path of the rims of the containers in one position, and having a predetermined number of teeth which can intermesh with the rims of the containers; carriage means supporting said wheel means mounted for longitudinal movement at a speed to separate a counted stack and move it rearwardly away from the uncounted containers to a disposal location; means mounting said wheel means for transverse movement on said carriage means relative to the stack from a position in which the teeth mesh with the rims to a position in which they do not; said wheel means including a transversely extending wedge block having a narrow end spaced transversely from said wheel means and a gradually enlarging end more remotely transversely spaced from said wheel means mounted to move transversely to said stack, when said wheel means is moved to a position in which the teeth do not engage, and initially cam the last container in a counted stack away from the uncounted containers; first electrically controlled motor means for moving said wheel means transversely; second electrically controlled motor means for moving said carriage longitudinally; first switch means on said carriage means; switch actuator means on said wheel means for actuating said first switch means, after a predetermined rotation of said wheel means and after a predesignated number of cups has been counted thereby, to energize said first motor means to move said wheel means transversely to a position in which the teeth do not engage said rims and said wedge block has separated the counted stack somewhat from the remaining nested containers; control means operating said second motor means for thence moving said carriage means rearwardly to remove the counted stack, and for then returning the carriage and wheel means; and sensing means upstream of the forward position of the wheel means for sensing when a stack of uncounted containers has been progressively built to a predetermined length and then operating said first motor means to move said wheel means transversely into container counting position to commence a counting and separating cycle.

2. The combination defined in claim 1 in which said support means comprises an endless belt having a top run extending through generally horizontally disposed tubular means forming a container stacking tunnel.

3. The combination defined in claim 1 in which said tubular means is open interjacent its ends and said sensing means includes electric eye means directing a beam through said opening which is interrupted when the stack builds to a predetermined length.

4. The combination defined in claim 2 in which said means for moving containers to said support means comprises a fluid pressure jet directed downwardly to tilt a container supplied rim down and a generally horizontally extending fluid pressure jet directed to complete the movement to horizontal position at the front end of the tunnel.

5. The combination defined in claim 1 in which laterally and rearwardly directed fluid pressure jets assist in moving the counted stack rearwardly at the end of the counting operation.

6. The combination defined in claim 1 in which said first and second motor means comprise fluid pressure operated cylinders.

7. Nested container counting and separating mechanism comprising: longitudinally extending support means over which rimmed containers to be counted are moved; means for moving containers to said support means and forming a horizontally disposed progressively building nested stack thereon; wheel means mounted for rotation in response to the pressure of said moving containers adjacent said support means in the path of the rims of the containers in one position, and having a predetermined number of teeth which can intermesh with the rims of the containers; carriage means for said wheel means mounted for longitudinal movement at a speed to separate a counted stack and move it rearwardly away from the uncounted containers to a disposal location; motor means for moving said carriage longitudinally; and means for moving said carriage and wheel means rearwardly to remove the counted stack after a predetermined rotation of said wheel means, and after a predesignated number of cups has been counted thereby, and for then returning the carriage and wheel means.

8. Nested container handling mechanism comprising: longitudinally extending support means over which rimmed containers to be counted are moved; means for moving containers to said support means and forming a horizontally disposed progressively building nested stack thereon; wheel means mounted for rotation in response to the pressure of said moving containers adjacent said support means in the path of the rims of the containers in one position, and having a predetermined number of teeth which can intermesh with the rims of the containers; means mounting said wheel means for transverse movement relative to the stack from a position in which the teeth mesh with the rims to a position in which they do not; means operable for moving said wheel means transversely, after a predetermined rotation thereof and after a predesignated number of cups has been counted thereby, to a position in which the teeth do not engage the rims; and sensing means upstream of the forward position of the wheel means for sensing when a stack of uncounted containers has been progressively built to a predetermined length operative to move said wheel means transversely into container counting position to commence a counting cycle.

9. The combination defined in claim 8 in which said support means comprises an endless belt having a top run extending through generally horizontally disposed means forming a container stacking tunnel.

10. The combination defined in claim 9 in which said means for moving containers to said support means comprises a fluid pressure jet directed at a downward angle to tilt a container, supplied rim down, and a generally horizontally extending fluid pressure jet directed to complete the movement to horizontal position at the front end of the tunnel.

11. The combination defined in claim 8 in which said wheel means includes a cam, mounted to move transversely to the stack when the wheel means is moved to a position in which the teeth do not engage the rims, and cam the counted stack rearwardly.

12. The combination defined in claim 8 in which means locks said wheel means against rotation when said wheel means is moved to a position in which the teeth do not engage the rims.

13. Nested container counting and separating mechanism comprising: means forming a progressively building, elongate, nested stack; counter means mounted for movement in the path of the rims of the containers in one position, and having a predetermined number of teeth which can intermesh with the rims of the containers; means mounted for longitudinal movement at a speed to separate a counted stack and move it rearwardly away from the uncounted containers to a disposal location after a predetermined movement of said counter means, and after a predetermined number of containers has been counted; and sensing means upstream of the counter means for sensing when a stack of uncounted containers has been built to a predetermined length and effecting movement of said counter means to count another stack.

References Cited
UNITED STATES PATENTS

| | | | |
|---|---|---|---|
| 3,313,482 | 4/1967 | Midgley et al. | 235—98 |
| 3,420,387 | 1/1969 | Baum | 221—13 X |

ROBERT G. SHERIDAN, Primary Examiner

ROBERT J. SPAR, Assistant Examiner

U.S. Cl. X.R.

53—78; 214—8.5; 221—12, 13, 232, 278; 235—98